(12) United States Patent
Takeda

(10) Patent No.: US 11,175,194 B2
(45) Date of Patent: Nov. 16, 2021

(54) LOAD DETECTION DEVICE, LOAD DETECTION METHOD, AND WALKING SUPPORT DEVICE

(71) Applicant: Toyota Jidosha Kabushiki Kaisha, Toyota (JP)

(72) Inventor: Takahiro Takeda, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/752,996

(22) Filed: Jan. 27, 2020

(65) Prior Publication Data

US 2020/0240864 A1 Jul. 30, 2020

(30) Foreign Application Priority Data

Jan. 29, 2019 (JP) .............................. JP2019-012846

(51) Int. Cl.
  *G01L 5/00* (2006.01)
  *A61H 3/00* (2006.01)
(52) U.S. Cl.
  CPC .............. *G01L 5/0028* (2013.01); *A61H 3/00* (2013.01); *A61H 2003/007* (2013.01); *A61H 2201/165* (2013.01); *A61H 2201/1642* (2013.01); *A61H 2201/1671* (2013.01); *A61H 2201/5061* (2013.01)
(58) Field of Classification Search
  CPC ...... G01L 5/0028; G03G 21/186; A61H 3/00; A61H 2003/007; A61H 2201/1642; A61H 2201/165; A61H 2201/1671; A61H 2201/5061

USPC ...................................................... 73/862.381
See application file for complete search history.

(56) References Cited

U.S. PATENT DOCUMENTS

| 7,343,223 | B2* | 3/2008 | Miura | B25J 13/085 |
| | | | | 318/568.12 |
| 8,079,967 | B2* | 12/2011 | Ikeuchi | A61H 3/008 |
| | | | | 601/5 |
| 9,700,258 | B2* | 7/2017 | Jiang | G01L 1/127 |
| 10,507,156 | B2* | 12/2019 | Fujikake | A61H 1/024 |
| 2010/0210980 | A1* | 8/2010 | Kudoh | A61H 3/00 |
| | | | | 601/34 |

FOREIGN PATENT DOCUMENTS

JP 2017-49134 A 3/2017

* cited by examiner

Primary Examiner — Octavia Hollington
(74) Attorney, Agent, or Firm — Dinsmore & Shohl LLP

(57) ABSTRACT

A load detection device capable of preventing deterioration of the accuracy of a load detection with the lapse of time is provided. A first exemplary aspect is a load detection device, including: a load detection part including a curved surface; an application member comprising a flat surface; and a transmission member located between the load detection part and the application member. The curved surface of the load detection part and a first surface of the transmission member come into point contact with each other, and the flat surface of the application member and a second surface opposite to the first surface of the transmission member come into surface contact with each other.

7 Claims, 7 Drawing Sheets

LOAD DETECTION DEVICE, LOAD DETECTION METHOD, AND WALKING SUPPORT DEVICE

CROSS REFERENCE TO RELATED APPLICATIONS

This application is based upon and claims the benefit of priority from Japanese patent application No. 2019-012846, filed on Jan. 29, 2019, the disclosure of which is incorporated herein in its entirety by reference.

BACKGROUND

The present disclosure relates to a load detection device, a load detection, method, and a walking support device.

A load detection device commonly includes a load detection part and an application member that applies a load to the load detection part, in which a curved surface of the load detection part is in point contact with the application member in order to absorb a relative inclination between the load detection part and the application member during assembly of the load detection device.

It should be noted that the load detection device disclosed in Japanese Unexamined Patent Application Publication No. 2017-49134 includes a resin part on the surface of the application member which comes into contact with the load detection part so that a force in the shear direction, which is a noise component, is not transmitted from the contact part between the curved surface of the load detection part and the application member to the load detection part, in which when a shearing force is applied to the load detection device, the application member slides with respect to the load detection part.

SUMMARY

The applicant has however found the following problems. The load detection device disclosed in Japanese Unexamined Patent Application Publication No. 2017-49134 has a problem that due to repeated sliding at the contact part between the curved surface of the load detection part and the resin part of the application member, the resin part of the application member is deformed and thus the accuracy of a load detection deteriorates with the lapse of time.

The present disclosure has been made in view of the above-described problem and provides a load detection device, a load detection method, and a walking support device that can prevent deterioration of the accuracy of a load detection with the lapse of time.

A first exemplary aspect is a load detection device, including: a load detection part including a curved surface; an application member including a flat surface; and a transmission member located between the load detection part and the application member, in which the curved surface of the load detection part and a first surface of the transmission member come into point contact with each other, the flat surface of the application member and a second surface opposite to the first surface of the transmission member come into surface contact with each other, and an amount of sliding of the application member with respect to the transmission member is larger than that of the load detection part with respect to the transmission member when a shearing force is applied to the load detect on device.

By such a configuration, when a shearing force is applied to the load detection device, the application member and the transmission member can relatively slide in the shear direction at the contact part between the flat surface of the application member and the second surface of the transmission member and absorb the shearing force, thereby preventing the flat surface of the application member from being deformed with the lapse of time. Accordingly, it is possible to prevent deterioration of the accuracy of a load detection with the lapse of time.

In the above-described load detection device, a friction coefficient between the curved surface of the load detection part and the first surface of the transmission member may be larger than that between the flat surface of the application member and the second surface of the transmission member.

The above-described load detection device may further include a returning member configured to return, when an initial state is a state in which no shear force is applied to the load detection device and the load detection part does not move relative to the transmission member, the transmission member to the initial state.

By doing so, it is possible to easily cause the transmission member to follow the movement of the load detection part when the shearing force acting on the load detection device is eliminated, whereby a positional deviation between the load detection part and the transmission member can be prevented.

In the above-described load detection device, the application member may have a cylindrical shape with a bottom, the transmission member and the returning member being housed inside the application member, and that a part of the returning member be covered with a cover member configured to prevent the returning member from being disengaged from the application member.

By doing so, it is possible to prevent the returning member from being disengaged from the inside of the application member.

The above-described load detection device may further include a connecting member configured to connect the load detection part to the transmission member and limit relative movement between the load detection part and the transmission member.

By doing so, it is possible to reliably increase the amount of sliding of the application member with respect to the transmission member compared to that of the load detection part with respect to the transmission member when a shearing force is applied to the load detection device.

The above-described load detection device may include a dust-preventing member configured to prevent foreign matter from entering the contact part between the load detection part and the transmission member.

By doing so, it is possible to prevent foreign matter from entering the contact part between the load detection part and the transmission member.

Another exemplary aspect is a walking support device including the above-described load detection device.

Another exemplary aspect is a load detection method using a load detection device, the load detection device including: a load detection part including a curved surface; an application member including a flat surface; and a transmission member located between the load detection part and the application member, the load detection method including bringing the curved surface of the load detection part and a first surface of the transmission member into point contact with each other, bringing the flat surface of the application member and a second surface opposite to the first surface of the transmission member into surface contact with each other, and making an amount of sliding of the application member with respect to the transmission member larger than that of the load detection part with respect to the transmission member when a shearing force is applied to the load detection device.

According to the present disclosure, it is possible to provide a load detection device, a load detection method, and a walking support device that can prevent deterioration of the accuracy of a load detection with the lapse of time.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Specific embodiments to which the present disclosure is applied will be described hereinafter in detail with reference to the drawings. However, the present disclosure is not limited to the embodiments shown below. Further, for the clarification of the explanation, the following descriptions and the drawings are simplified as appropriate.

<First Embodiment>

Figure 1:
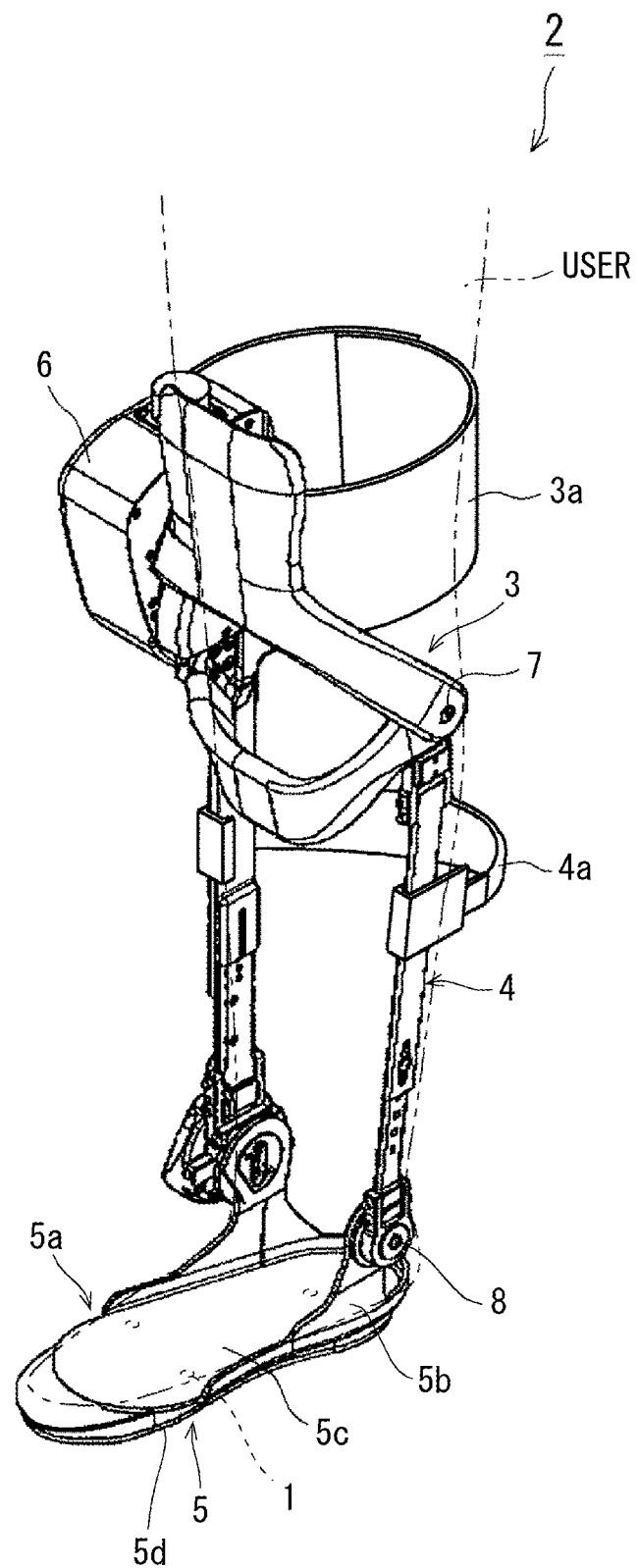
FIG. 1 is a perspective view schematically showing a walking support device to which a load detection device according to a first embodiment is applied.

FIG. 1 is a perspective view schematically showing a walking support device to which a load detection device according to this embodiment is applied. As shown in FIG. 1, a load detection device 1 according to this embodiment is applied to a walking support device 2. First, the structure of the walking support device 2 to which the load detection device 1 according to this embodiment is applied is briefly described.

The walking support device 2 includes an upper thigh link 3, a lower thigh link 4, a foot part 5, and a drive unit 6, and is attached to the leg of a user to support a bending and stretching movement of the knee joint of the leg. The upper thigh link 3 is fixed to the upper thigh of a user via a fixing band 3a.

The lower thigh link 4 is fixed to the lower thigh of a user via a fixing band 4a. The lower end of the upper thigh link 3 and the upper end of the lower thigh link 4 are coupled to each other via a rotation axis 7 extending in the lateral direction of the walking support device 2, and the upper thigh link 3 and the lower thigh link 4 can relatively rotate around the rotation axis 7.

The foot part 5 includes a sole placement part 5a on which the sole of a user is placed. A protruding part 5b protruding from the sole placement part 5a and the lower end of the lower thigh link 4 are coupled to each other via a rotation axis 8 extending in the lateral direction of the walking support device 2, and the foot part 5 and the lower thigh link 4 can relatively rotate via the rotation axis 8. Note that the sole placement part 5a according to this embodiment includes an upper sole 5c and a lower sole 5d, and the upper sole 5c and the lower sole 5d are coupled to each other so that they can be relatively displaced.

The drive unit 6 includes, for example, a motor and a speed reducer (not shown), and the driving force of the motor is transmitted to the rotation axis 7 via the speed reducer, thereby relatively rotating the upper thigh link 3 and the lower thigh link 4.

Figure 2:
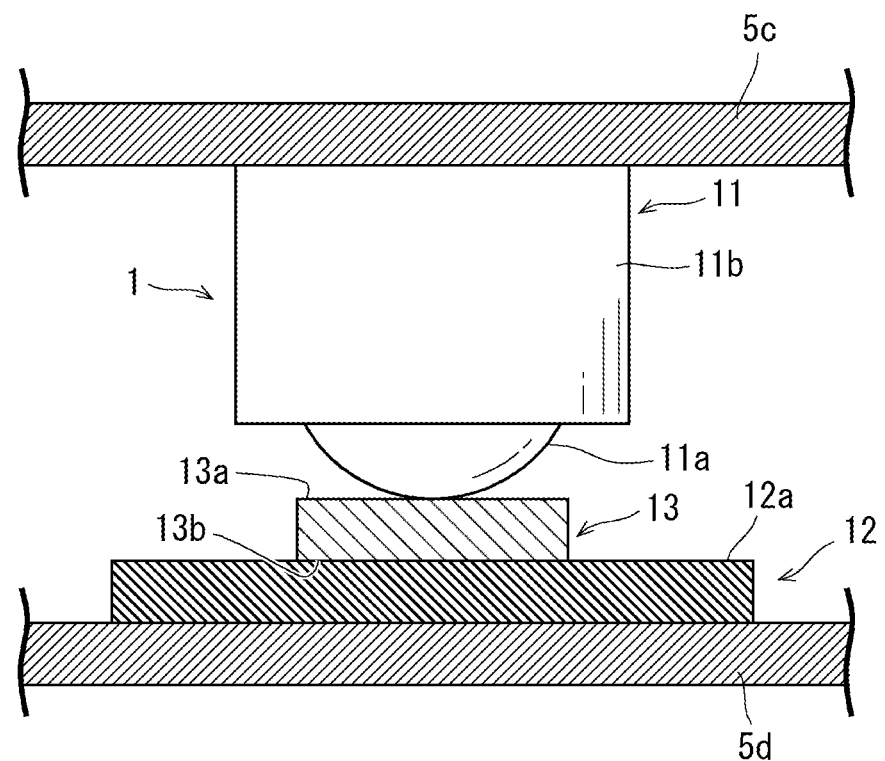
FIG. 2 is a partial cross-sectional view schematically showing the load detection device according to the first embodiment.

In the above-described walking support device 2, the load detection device 1 according to this embodiment is located on the foot part 5 in order to determine whether the leg of a user is in a leg-idling state or a leg-supported state. Next, the structure of the load detection device 1 according to this embodiment is described. FIG. 2 is a partial cross-sectional view schematically showing the load detection device according to this embodiment.

As shown in FIG. 2, the load detection device 1 includes a load detection part 11, an application member 12, and a transmission member 13, and is located between the upper sole 5c and the lower sole 5d of the sole placement part 5a.

The load detection part 11 is, for example, a one-axis sensor that detects a load in the direction perpendicular to the upper sole 5c. However, the load detection part 11 may instead be a multi-axis sensor. The load detection part 11 includes a housing 11b including a curved surface 11a formed on the lower surface thereof, and a strain gauge and the like are housed inside the housing 11b. Further, the load detection part 11 is configured so that a load is transmitted to the strain gauge via the curved surface 11a. In the above-described load detection part 11, the upper end of the housing 11b is fixed to the lower surface of the upper sole 5c.

The application member 12 includes a flat surface 12a on the upper surface thereof, and has, for example, a plate-like shape. Further, the lower end of the application member 12 is fixed to the upper surface of the lower sole 5d. However, the shape of the application member 12 is not limited to a plate-like shape, and it is sufficient that the application member 12 include at least a flat surface 12a on the upper surface thereof.

The transmission member 13 is located between the load detection part 11 and the application member 12. The transmission member 13 has, for example, a plate-like shape in which an upper surface (a first surface) 13a and a lower surface (a second surface) 13b of the transmission member 13 are flat. Further, the upper surface 13a of the transmission member 13 is substantially in point contact with the curved surface 11a of the load detection part 11, and the lower surface 13b of the transmission member 13 is substantially in surface contact with the flat surface 12a of the application member 12. The above-described transmission member 13 has such a rigidity that the contact part with the load detection part 11 is not substantially deformed.

Note that the load detection device 1 according to this embodiment is configured so that when a shearing force is applied to the load detection device 1, the amount of sliding of the application member 12 with respect to the transmission member 13 becomes larger than that of sliding of the load detection part 11 with respect to the transmission member 13.

In order to achieve such a configuration, the load detection device 1 according to this embodiment is configured so that the friction coefficient of the contact part between the curved surface 11a of the load detection part 11 and the upper surface 13a of the transmission member 13 is larger than that of the contact part between the flat surface 12a of the application member 12 and the lower surface 13b of the transmission member 13.

Specifically, the load detection device 1 according to this embodiment can be configured so that the friction coefficient of the contact part between the curved surface 11a of the load detection part 11 and the upper surface 13a of the transmission member 13 becomes larger than that of the contact part between the flat surface 12a of the application member 12 and the lower surface 13b of the transmission member 13 by increasing the surface roughness of the upper surface 13a of the transmission member 13 with respect to that of the lower surface 13b.

Further, the load detection device 1 according to this embodiment can be configured so that the friction coefficient of the contact part between the curved surface 11a of the load detection part 11 and the upper surface 13a of the transmission member 13 becomes larger than that of the contact part between the flat surface 12a of the application member 12 and the lower surface 13b of the transmission member 13 by applying a lubricant between the flat surface 12a of the application member 12 and the lower surface 13b of the transmission member 13, and applying, to at least one of the flat surface 12a of the application member 12 and the lower surface 13b of the transmission member 13, a surface treatment for reducing friction due to fluororesin processing or the like.

Further, the load detection device 1 according to this embodiment can be configured so that the friction coefficient of the contact part between the curved surface 11a of the load detection part 11 and the upper surface 13a of the transmission member 13 becomes larger than that of the contact part between the flat surface 12a of the application member 12 and the lower surface 13b of the transmission member 13 by selecting materials of the housing 11b of the load detection part 11, the application member 12, and the transmission member 13.

For example, the load detection device 1 according to this embodiment can be configured so that the friction coefficient of the contact part between the curved surface 11a of the load detection part 11 and the upper surface 13a of the transmission member 13 becomes larger than that of the contact part between the flat surface 12a of the application member 12 and the lower surface 13b of the transmission member 13 by forming the housing 11b of the load detection part 11 with SUS630, forming the application member 12 with resin such as Polyether Ether Ketone (PEEK), and forming the transmission member 13 with SUS304H. However, the materials of the housing 11b of the load detection part 11, the application member 12, and the transmission member 13 can be appropriately selected.

As described above, the load detection device 1 according to this embodiment is configured so that the curved surface 11a of the load detection part 11 and the upper surface 13a of the transmission member 13 are substantially in point contact with each other, and the flat surface 12a of the application member 12 and the lower surface 13b of the transmission member 13 are substantially in surface contact with each other, and the amount of sliding of the application member 12 with respect to the transmission member 13 becomes larger than that of sliding of the load detection part 11 with respect to the transmission member 13 when a shearing force is applied to the load detection device 1.

Accordingly, when a shearing force is applied to the load detection device 1, the application member 12 and the transmission member 13 can relatively slide in the shear direction at the contact part between the flat surface 12a of the application member 12 and the lower surface 13b of the transmission member 13 and absorb the shearing force, thereby preventing the flat surface 12a of the application member 12 from being deformed with the lapse of time. This configuration enables the load detection device 1 and the load detection method according to this embodiment and the walking support device 2 to which the load detection device 1 is applied to prevent deterioration of the accuracy of a load detection with the lapse of time.

The amount of sliding of the load detection part 11 with respect to the transmission member 13 may be much smaller than that of the sliding of the application member 12 with respect to the transmission member 13 (i.e., the load detection part 11 may hardly slide with respect to the transmission member 13). By doing so, it is possible to prevent the curved surface 11a of the load detection part 11 and the upper surface 13a of the transmission member 13 from being deformed. As a result, the change with the lapse of time of the contact state between the curved surface 11a of the load detection part 11 and the upper surface 13a of the transmission member 13 can be prevented, whereby the deterioration of the accuracy of a load detection with the lapse of time can be prevented.

Note that although the upper surface 13a of the transmission member 13 according to this embodiment is formed flat, it is sufficient that the upper surface 13a of the transmission member 13 be formed so as to substantially come into point contact with the curved surface 11a of the load detection part 11, and for example, the upper surface 13a of the transmission member 13 may include a curved surface having a large curvature with respect to the curvature of the curved surface 11a of the load detection part 11.

<Second Embodiment>

Figure 3:
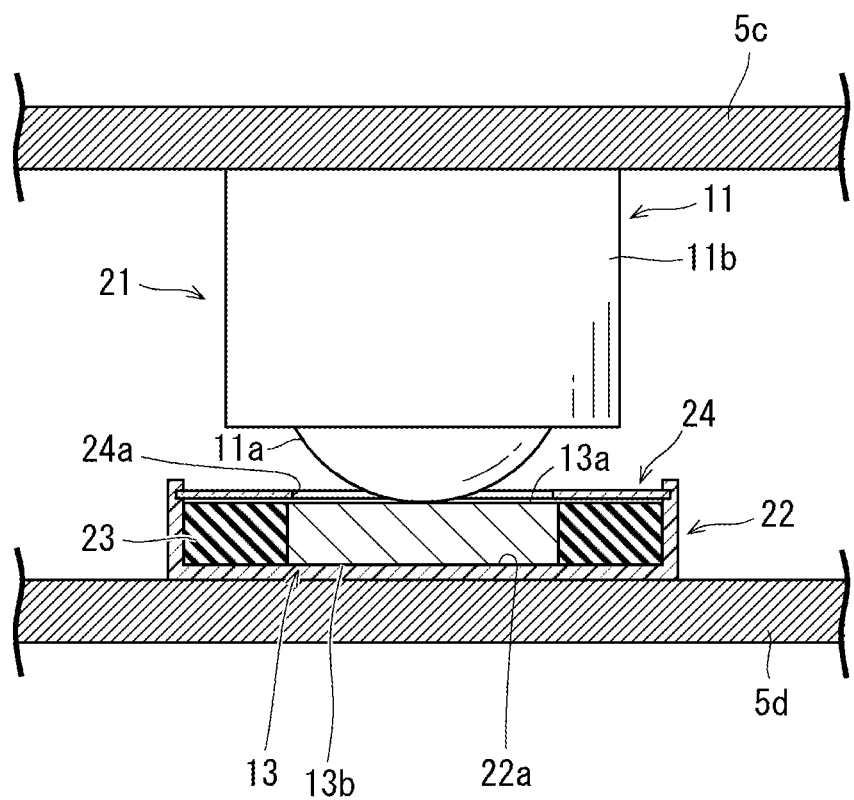
FIG. 3 is a partial cross-sectional view schematically showing the load detection device according to a second embodiment.

FIG. 3 is a partial cross-sectional view schematically showing the load detection device according to this embodiment. A load detection device 21 according to this embodiment is configured so that the transmission member 13, when the transmission member 13 has slid with respect to an application member 22, can be returned to the initial state before the sliding. Note that the configuration of the load detection device 21 according to this embodiment is substantially the same as that of the load detection device 1 according to the first embodiment, and thus duplicated descriptions are omitted and the same members are described using the same reference symbols.

As shown in FIG. 3, the configuration of the load detection device 21 according to this embodiment is the same as that of the load detection device 1 according to the first embodiment except that the shape of the member 22 is different from that of the load detection device 1 and that a returning member 23 and a cover member 24 are further provided.

The application member 22 has a cylindrical shape with a bottom and includes an opening on the upper side thereof. The lower surface of the above-described application member 22 is fixed to the upper surface of the lower sole 5d. Further, the transmission member 13 is housed inside the application member 22, and an inner bottom surface 22a of the application member 22 and the lower surface 13b of the transmission member 13 are substantially in surface contact with each other.

The returning member 23 returns, when the transmission member 13 has slid inside the application member 22, the transmission member 13 to the initial state before the sliding. The returning member 23 is, for example, an annular low-elastic rubber, and is located so as to fill the space between the inner side surface of the application member 22 and the side surface of the transmission member 13. However, the shape, the location, and the material of the returning member 23 are not limited as long as the transmission member 13, when the transmission member has slid inside the application member 22, can return to the initial state before the sliding.

The cover member 24 prevents the returning member 23 from being disengaged from the inside of the application member 22. The cover member 24 is an annular PET (amorphous polyester) plate having a penetrating part 24a through which the curved surface 11a of the load detection part 11 can pass.

The cover member 24 is located so as to cover the returning member 23, and the peripheral part of the cover member 24 is fitted into a groove formed on the inner side surface of the application member 22 so that the cover member 24 is fixed to the application member 22. However, the shape and the material of the cover member 24 are not limited as long as the returning member 23 can be prevented from being disengaged from the inside of the application member 22.

The above-described load detection device 21 according to this embodiment can returns, when the transmission member 13 has sild inside the application member 22, the transmission member 13 to the initial state before the sliding. Accordingly, it is possible to easily cause the transmission member 13 to follow the movement of the load detection part 11 when the shearing force acting on the load detection device 21 is eliminated, whereby a positional deviation between the load detection part 11 and the transmission member 13 can be prevented.

Further, it is possible to prevent, by the cover member 24, the returning member 23 from being disengaged from the inside of the application member 22.

<Third Embodiment>

Figure 4:
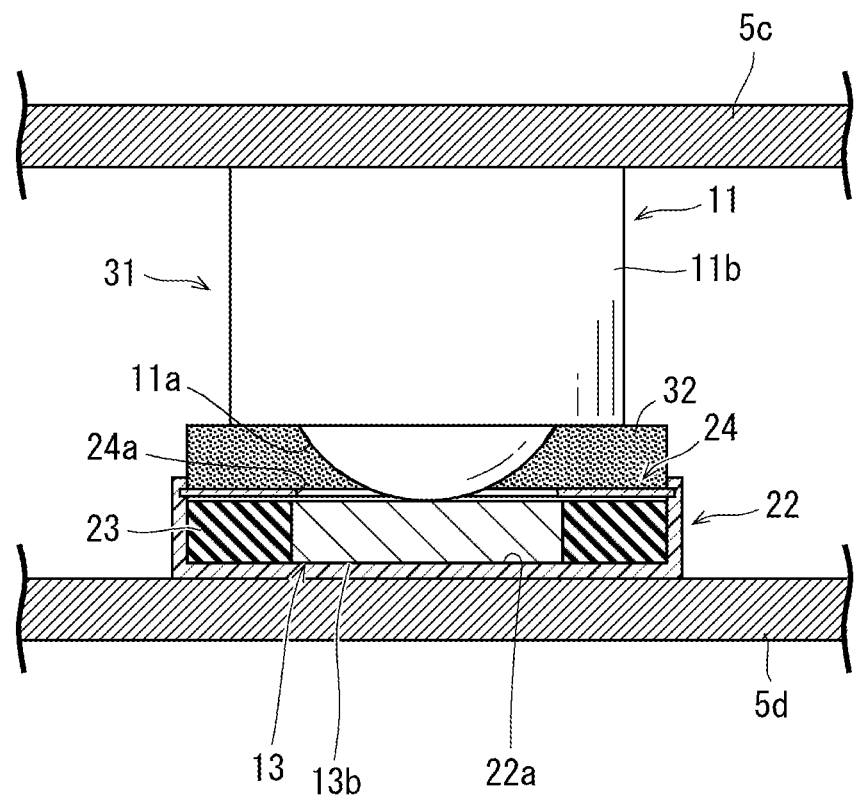
FIG. 4 is a partial cross-sectional view schematically showing the load detection device according to a third embodiment.

FIG. 4 is a partial cross-sectional view schematically showing the load detection device according to this embodiment. As shown in FIG. 4, a load detection device 31 according to this embodiment includes a dust-preventing member 32 so that foreign matter does not enter the contact part between the load detection part 11 and the transmission member 13. Note that the configuration of the load detection device 31 according to this embodiment is substantially the same as that of the load detection device 21 according to the second embodiment, and thus duplicated descriptions are omitted and the same members are described using the same reference symbols.

The dust-preventing member 32 is, for example, an annular continuous-foamed polyethylene foam material, and is located so as to surround the contact part between the load detection part 11 and the transmission member 15. Further, the upper surface of the dust-preventing member 32 is in contact with a part of the lower surface of the load detection part 11 surrounding the curved surface 11a, and the lower surface of the dust-preventing member 32 is in contact with the upper surface of the cover member 24.

By this configuration, the dust-preventing member 32 fills the space between the lower surface of the load detection part 11 and the upper surface of the cover member 24 so as to surround the contact part between the load detection part 11 and the transmission member 13, and thus foreign matter can be prevented from entering the contact part. However, the shape, the location, and material of the dust-preventing member 32 are not limited as long as foreign matter can be prevented from entering the contact part between the load detection part 11 and the transmission member 13. It should be noted that the material of the dust-preventing member 32 may be a resin material preventing deterioration with the lapse of time.

<Fourth Embodiment>

Figure 5:
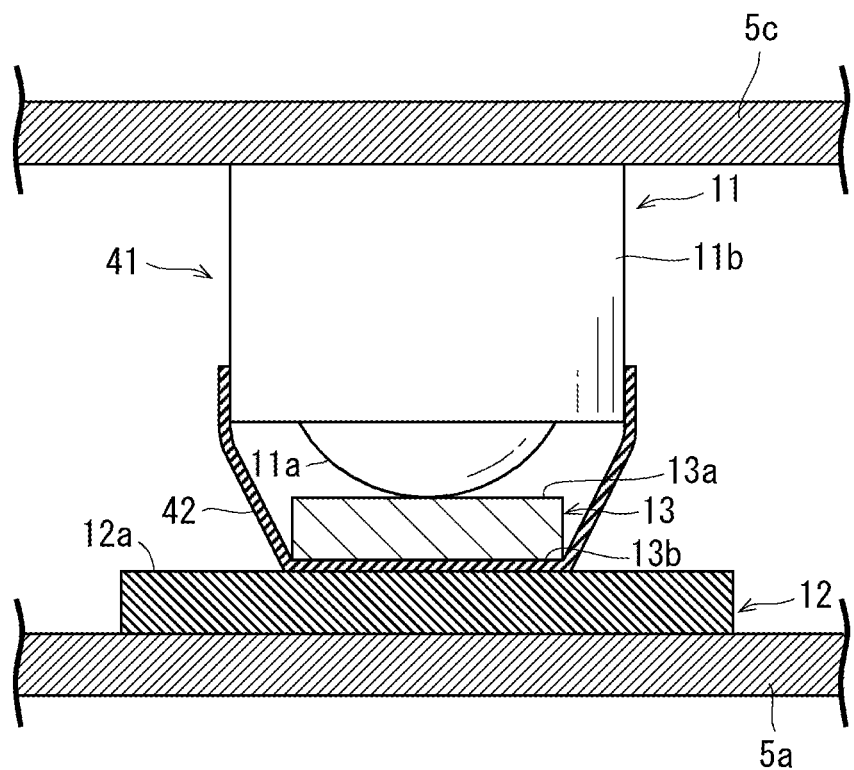
FIG. 5 is a partial cross-sectional view schematically showing the load detection device according to a fourth embodiment.

FIG. 5 is a partial cross-sectional view schematically showing the load detection device according to this embodiment. As shown in FIG. 5, a load detection device 41 according to this embodiment is configured so that the amount of sliding of the application member 12 with respect to the transmission member 13 becomes larger than that of sliding of the load detection part 11 with respect to the transmission member 13 when a shearing force is applied to the load detection device 41 by connecting the load detection part 11 to the transmission member 13 with a connecting member 42. Note that in the following description, duplicated descriptions as those in the first embodiment etc., are omitted and the same members are described using the same reference symbols.

The connecting member 42 is, for example, a rubber sheet, and the lower surface 13b of the transmission member 13 is bonded to the upper surface of the connecting member 42 with an adhesive or the like. Further, while the upper surface 13a of the transmission member 13 is substantially in point contact with the curved surface 11a of the load detection part 11, the peripheral part of the connecting member 42 is connected to the side surface of the housing 11b of the load detection part 11 so as to wrap the transmission member 13 with the connecting member 42. By this configuration, the contact part between the load detection part 11 and the transmission member 13 is covered with the connecting member 42, and thus foreign material can be prevented from entering that contact part. That is, the connecting member 42 also functions as a dust-preventing member.

It should be noted that the lower surface 13b of the transmission member 13 substantially comes into surface contact with the flat surface 12a of the application member 12 via the connecting member 42. Note that a lubricant may be applied between the connecting member 42 and the flat surface 12a of the application member 12, and that a surface treatment for reducing friction due to fluororesin processing or the like be applied to the flat surface 12a of the application member 12.

By such a configuration, the relative movement between the load detection part 11 and the transmission member 13 is limited by the connecting member 42, and thus it is possible to reliably increase the amount of sliding of the application member 12 with respect to the transmission member 13 compared to that of the load detection part 11 with respect to the transmission member 13 when a shearing force is applied to the load detection device 41.

Further, in this embodiment, as the lower surface 13b of the transmission member 13 is bonded to the upper surface of the connecting member 42 with an adhesive to fix the position of the transmission member 13, the position of the transmission member 13 is not deviated when the connecting member 42 is connected to the load detection part 11.

However, the lower surface 13b of the transmission member 13 may not be bonded to the upper surface of the connecting member 42.

<Fifth Embodiment>

Figure 6:
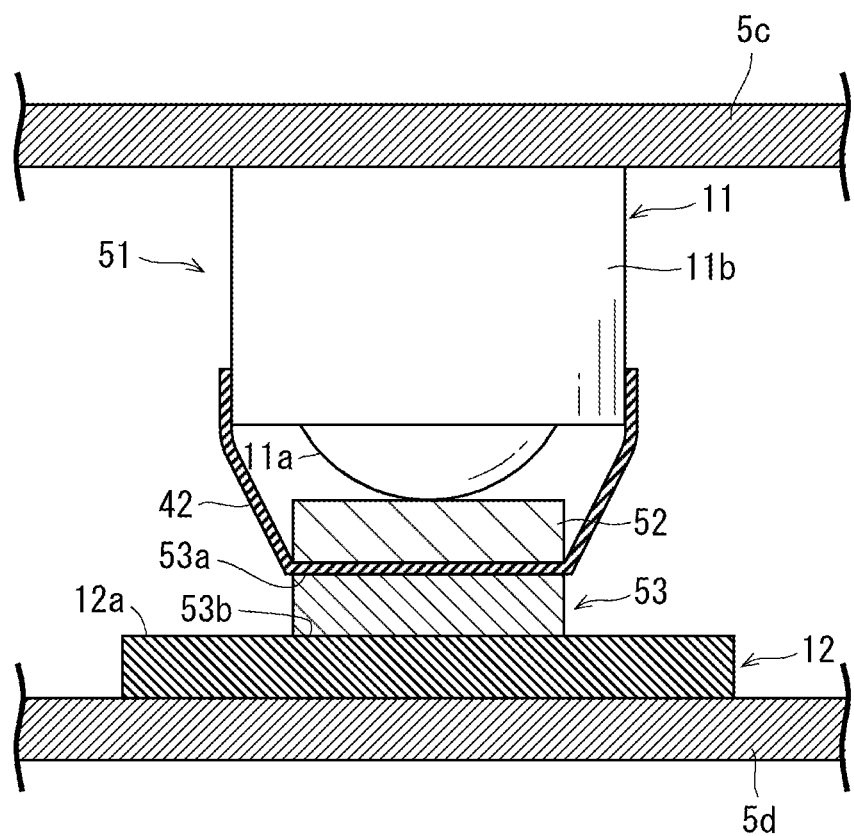
FIG. 6 is a partial cross-sectional view schematically showing the load detection device according to a fifth embodiment.

FIG. 6 is a partial cross-sectional view schematically showing the load detection device according to this embodiment. As shown in FIG. 6, a load detection device 51 according to this embodiment is configured so that the connecting member 42 is sandwiched between a first transmission member 52 and a second transmission member 53. Note that in the following description, the configuration of the load detection device 51 is substantially the same as that of the load detection device 41 according to the fourth embodiment, and thus duplicated descriptions are omitted and the same members are described using the same reference symbols.

The first transmission member 52 corresponds to the transmission member 13 according to the fourth embodiment, and the lower surface of the first transmission member 52 is bonded to the upper surface of the connecting member 42. Further, for example, the second transmission member 53 includes an upper surface 53a and a lower surface 53b each having a flat plate shape, and has substantially the same shape as that of the first transmission member 52 when viewed from the vertical direction. The upper surface 53a of the second transmission member 53 described above is bonded to the lower surface of the connecting member 42 so that the connecting member 42 is sandwiched between the first and the second transmission members 52 and 53.

By such a configuration, it is possible to prevent the connecting member 42 from being rubbed against the application member 12 and damaged. It should be noted that the load detection device 51 may be configured so that the friction coefficient of the surface of the second transmission member 53 becomes smaller than that of the surface of the first transmission member 52. By doing so, it is possible to reliably increase the amount of sliding of the application member 12 with respect to the second transmission member 53 compared to that of the load detection part 11 with respect to the first transmission member 52 when a shearing force is applied to the load detection device 51.

<Sixth Embodiment>

Figure 7:
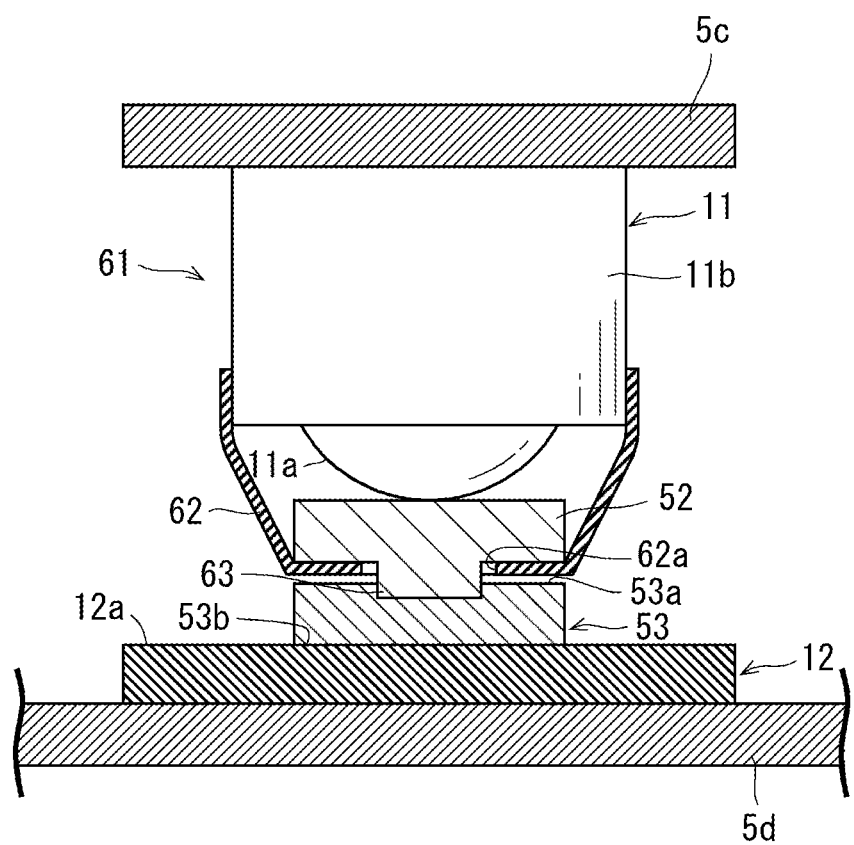
FIG. 7 is a partial cross-sectional view schematically showing the load detection device according to a sixth embodiment.

FIG. 7 is a partial cross-sectional view schematically showing the load detection device according to this embodiment. As shown in FIG. 7, a load detection device 61 according to this embodiment includes the first transmission member 52 and the second transmission member 53 coupled to each other via a coupling member 63 which is passed through a through hole 62a formed in a connecting member 62. Note that in the following description, the configuration of the load detection device 61 is substantially the same as that of the load detection device 51 according to the fifth embodiment, and thus duplicated descriptions are omitted and the same members are described using the same reference symbols.

As shown in FIG. 7 the second transmission member 53 according to this embodiment is not bonded to the lower surface of the connecting member 62, so as to leave a gap therebetween. The first transmission member 52 and the second transmission member 53 are coupled to each other via the coupling member 63 such as a bolt passed through the through hole 62a of the connecting member 62.

However, means for coupling the first transmission member 52 to the second transmission member 53 is not limited to a bolt, and for example, a pin protruding from one of the first and the second transmission members 52 and 53 may be press-fitted into a hole formed in the other, and the first and the second transmission members 52 and 53 may be coupled to each other via an adhesive. In short, it is sufficient that the load detection device 61 be configured so that a load can be transmitted between the first and the second transmission members 52 and 53 while a gap is formed between the lower surface of the connecting member 62 and the upper surface 53a of the second transmission member 53.

By such a configuration, when a shearing force is applied to the load detection device 61, it is possible to prevent the shearing force from being transmitted to the connecting member 62 via the second transmission member 53, thereby preventing the connecting member 62 from being damaged.

The present disclosure is not limited to the aforementioned embodiments, and can be appropriately changed without departing from the spirit of the disclosure.

Although the connecting member according to the aforementioned embodiments is composed of a rubber sheet, the material, as well as the location and shape, of the connecting member) is not limited as long as the relative movement between the load detection part and the transmission member can be limited by connecting the load detection part to the transmission member. Further, when the contact part between the load detection part and the transmission member is not covered with the connecting member, a dust-preventing member may be located so as to cover the contact part between the load detection part and the transmission member in order to prevent foreign matter from entering the contact part therebetween.

The load detection device according to the aforementioned embodiments achieves the configuration, in which the amount of sliding of the application member with respect to the transmission member becomes larger than that of the load detection part with respect to the transmission member when a shearing force is applied to the load detection device, by increasing the friction coefficient of the contact part between the curved surface 11a of the load detection part 11 and the upper surface 13a of the transmission member 13 compared to that of the contact part between the flat surface 12a of the application member 12 and the lower surface 13b of the transmission member 13, and connecting the load detection part 11 to the transmission member 13 with the connecting member.

However, when a shearing force is applied to the load detection device, the configuration of the load detection device is not limited as long as the configuration, in which the amount of sliding of the application member with respect to the transmission member is larger than that of sliding of the load detection part with respect to the transmission member, can be achieved, and for example, the above-described configurations may be achieved by increasing the magnetic adsorption force between the load detection device and the transmission member compared to that between the application member and the transmission member.

Although the load detection device according to the aforementioned embodiments is applied to the walking support device 2, the device to which the load detection device is applied is not limited.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A load detection device comprising:
   a load detection part comprising a curved surface;

an application member comprising a flat surface;

a transmission member located between the load detection part and the application member; and a returning member configured to return, when an initial state is a state in which no shear force is applied to the load detection device and the load detection part does not move with respect to the transmission member, the transmission member to the initial state, wherein the curved surface of the load detection part and a first surface of the transmission member come into point contact with each other, the flat surface of the application member and a second surface opposite to the first surface of the transmission member come into surface contact with each other, and an amount of sliding of the application member with respect to the transmission member in a shear direction due to a shearing force applied to the load detection device is larger than an amount of sliding of the load detection part with respect to the transmission member in the shear direction due to the shearing force applied to the load detection device.

2. The load detection device according to claim 1, wherein a friction coefficient between the curved surface of the load detection part and the first surface of the transmission member is larger than that between the flat surface of the application member and the second surface of the transmission member.

3. The load detection device according to claim 1, wherein
the application member has a cylindrical shape with a bottom, the transmission member and the returning member being housed inside the application member, and a part of the returning member is covered with a cover member configured to prevent the returning member from being disengaged from the application member.

4. The load detection device according to claim 1, further comprising a connecting member configured to connect the load detection part to the transmission member and limit relative movement between the load detection part and the transmission member.

5. The load detection device according to claim 1, further comprising a dust-preventing member configured to prevent foreign matter from entering the contact part between the load detection part and the transmission member.

6. A walking support device comprising the load detection device according to claim 1.

7. A load detection method using a load detection device, the load detection device comprising:

a load detection part comprising a curved surface;

an application member comprising a flat surface; and a transmission member located between the load detection part and the application member; and a connecting member configured to connect the load detection part to the transmission member and limit relative movement between the load detection part and the transmission member, the load detection method comprising bringing the curved surface of the load detection part and a first surface of the transmission member into point contact with each other, bringing the flat surface of the application member and a second surface opposite to the first surface of the transmission member into surface contact with each other, and making an amount of sliding of the application member with respect to the transmission member in a shear direction due to a shearing force applied to the load detection device larger than an amount of sliding of the load detection part with respect to the transmission member in the shear direction due to the shearing force applied to the load detection device.

* * * * *